United States Patent
Krishnan et al.

(10) Patent No.: US 10,818,988 B2
(45) Date of Patent: Oct. 27, 2020

(54) ELECTROCHEMICAL CELL COMPRISING AN ELECTRODEPOSITED FUEL

(71) Applicant: NANTENERGY, INC., Scottsdale, AZ (US)

(72) Inventors: Ramkumar Krishnan, Scottsdale, AZ (US); Cody Friesen, Fort McDowell, AZ (US); Joel Hayes, Chandler, AZ (US); Todd Trimble, Phoenix, AZ (US); Grant Friesen, Fountain Hills, AZ (US)

(73) Assignee: FORM ENERGY, INC., Somerville, MA (US)

( * ) Notice: Subject to any disclaimer, the term of this patent is extended or adjusted under 35 U.S.C. 154(b) by 434 days.

(21) Appl. No.: 15/076,058

(22) Filed: Mar. 21, 2016

(65) Prior Publication Data
US 2016/0276723 A1    Sep. 22, 2016

Related U.S. Application Data

(60) Provisional application No. 62/135,511, filed on Mar. 19, 2015.

(51) Int. Cl.
*H01M 4/42* (2006.01)
*H01M 8/22* (2006.01)
(Continued)

(52) U.S. Cl.
CPC .......... *H01M 12/08* (2013.01); *H01M 2/385* (2013.01); *H01M 4/38* (2013.01); *H01M 4/42* (2013.01);
(Continued)

(58) Field of Classification Search
None
See application file for complete search history.

(56) References Cited

U.S. PATENT DOCUMENTS

| 8,168,337 B2 | 5/2012 | Friesen et al. |
| 8,309,259 B2 | 11/2012 | Friesen et al. |

(Continued)

FOREIGN PATENT DOCUMENTS

| DE | 1 671 929 | 10/1971 |
| DE | 693 06 598 | 6/1997 |

(Continued)

OTHER PUBLICATIONS

International Preliminary Report on Patentability PCT/US2016/023439 dated May 31, 2017.
(Continued)

*Primary Examiner* — Cynthia H Kelly
*Assistant Examiner* — Julian Anthony
(74) *Attorney, Agent, or Firm* — Pillsbury Winthrop Shaw Pittman, LLP (57) ABSTRACT

Provided is a rechargeable electrochemical cell system for generating electrical current using a fuel and an oxidant. The system includes a plurality of electrochemical cells. A controller is configured to apply an electrical current between charging electrode(s) and a fuel electrode with the charging electrode(s) functioning as an anode and the fuel electrode functioning as a cathode, such that reducible metal fuel ions in the ionically conductive medium are reduced and electrodeposited as metal fuel in oxidizable form on the fuel electrode. The controller may selectively apply current to a charging electrode and third electrode between fuel electrodes of separate cells to increase uniformity of the metal fuel being electrodeposited on the fuel electrode. The controller controls a number of switches to apply current to the electrodes and select different modes for the system. Also provided are methods for charging and discharging an electrochemical cell system, and selecting different modes.

36 Claims, 2 Drawing Sheets

(51) Int. Cl.
*H01M 8/04* (2016.01)
*H01M 12/08* (2006.01)
*H01M 2/38* (2006.01)
*H01M 10/04* (2006.01)
*H01M 10/44* (2006.01)
*H01M 4/38* (2006.01)
*H01M 8/08* (2016.01)
*H01M 8/18* (2006.01)
*H01M 10/02* (2006.01)
*H01M 10/06* (2006.01)
*H01M 10/30* (2006.01)
*H01M 4/02* (2006.01)

(52) U.S. Cl.
CPC ............ *H01M 8/08* (2013.01); *H01M 8/186* (2013.01); *H01M 10/02* (2013.01); *H01M 10/0445* (2013.01); *H01M 10/44* (2013.01); *H01M 10/441* (2013.01); *H01M 10/443* (2013.01); *H01M 10/06* (2013.01); *H01M 10/30* (2013.01); *H01M 2004/027* (2013.01); *Y02E 60/128* (2013.01)

(56) References Cited

U.S. PATENT DOCUMENTS

| | | | |
|---|---|---|---|
| 8,491,763 B2 | 7/2013 | Friesen | |
| 8,492,052 B2 | 7/2013 | Friesen et al. | |
| 8,659,268 B2 | 2/2014 | Krishnan et al. | |
| 8,877,391 B2 | 11/2014 | Friesen et al. | |
| 8,895,197 B2 | 11/2014 | Friesen et al. | |
| 8,906,563 B2 | 12/2014 | Friesen et al. | |
| 8,911,910 B2 | 12/2014 | Krishnan et al. | |
| 9,105,910 B2 | 8/2015 | Friesen et al. | |
| 9,105,946 B2 | 8/2015 | Friesen et al. | |
| 9,178,207 B2 | 11/2015 | Friesen et al. | |
| 9,269,995 B2 | 2/2016 | Friesen et al. | |
| 9,269,996 B2 | 2/2016 | Friesen et al. | |
| 2002/0146600 A1* | 10/2002 | Vartak | H01M 10/42 429/9 |
| 2010/0316935 A1 | 12/2010 | Friesen et al. | |
| 2011/0070506 A1* | 3/2011 | Friesen | H01M 8/04873 429/404 |
| 2011/0250512 A1 | 10/2011 | Friesen et al. | |
| 2012/0321969 A1 | 12/2012 | Friesen et al. | |
| 2013/0115523 A1 | 5/2013 | Friesen et al. | |
| 2013/0115526 A1 | 5/2013 | Friesen et al. | |
| 2014/0091631 A1 | 4/2014 | Naden et al. | |
| 2014/0227615 A1 | 8/2014 | Friesen et al. | |
| 2014/0262760 A1 | 9/2014 | Hayes et al. | |
| 2014/0266056 A1 | 9/2014 | Trimble et al. | |
| 2015/0104679 A1 | 4/2015 | Trimble et al. | |

FOREIGN PATENT DOCUMENTS

| | | | | |
|---|---|---|---|---|
| FR | 2 770 342 | | 4/1999 | |
| FR | 2 998 719 | | 5/2014 | |
| GB | 1179777 | * | 1/1970 | ............ H01M 45/04 |

OTHER PUBLICATIONS

International Search Report dated Aug. 31, 2016 for Appln. No. PCT/US2016/023439.

* cited by examiner

ELECTROCHEMICAL CELL COMPRISING AN ELECTRODEPOSITED FUEL

CROSS REFERENCE TO RELATED APPLICATION

This patent application claims priority to provisional patent application Ser. No. 62/135,511 filed on Mar. 19, 2015, and is incorporated by reference herein in its entirety.

FIELD

The invention relates to electrochemical cells comprising electrodeposited metal fuel, and more particularly to configuring and operating electrochemical cell systems to reversibly produce more uniform metal fuel plating.

BACKGROUND

Various types of electrochemical cells using metal as the fuel are known, such as metal-air, Pb-acid, and Ni—Zn batteries. For example, a metal-air cell typically comprises a fuel electrode at which metal fuel is oxidized and an air breathing cathode at which oxygen from ambient air is reduced during a discharge mode. During a charge mode, the metal fuel is reduced and electrodeposited at the fuel electrode, thereby storing the metal fuel for a future discharge process. At the same time, oxygen gas is generated when the charging electrode oxidizes the ions of oxidizer disassociated from the metal oxide. The electrochemical cell comprises an electrolyte for supporting reactions of the oxidized/reduced ions.

The electrodeposited metal fuel is deposited as a result of the electric field set up in the electrolyte. The distribution of the electric current about the fuel electrode affects the resulting thickness and uniformity of electroplated metal fuel on its surface. For example, edges and corners of the fuel electrode are generally characterized by higher electric fields which translate to higher potentials, higher metal fuel electrodeposition rates and thus, a higher probability for dendrite formation.

Among other things, the present application endeavors to provide an effective and improved way of operating electrochemical cells comprising electrodeposited metal fuel to reversibly produce more uniform metal fuel plating.

SUMMARY

One aspect of the invention provides a rechargeable electrochemical cell system for generating electrical current using a fuel and an oxidant. The cell system comprises a plurality of electrochemical cells. Each electrochemical cell comprises a fuel electrode, an oxidant electrode spaced apart from the fuel electrode, a first charging electrode positioned between the oxidant electrode and the fuel electrode, and a second charging electrode positioned on the side of the oxidant electrode opposite the side facing the fuel electrode. The cell system further comprises a third charging electrode positioned between the fuel electrodes of separate electrochemical cells, an ionically conductive medium common to the plurality of electrochemical cells and contacting the electrodes of each, and a controller coupled to the plurality of electrodes.

Another aspect of the present invention provides for a method for charging an electrochemical cell system. The cell system comprises a plurality of electrochemical cells. Each electrochemical cell comprises a fuel electrode, an oxidant electrode spaced apart from the fuel electrode, a first charging electrode positioned between the oxidant electrode and the fuel electrode, and a second charging electrode positioned on the side of the oxidant electrode opposite the side facing the fuel electrode. The cell system further comprises a third charging electrode positioned between the fuel electrodes of separate electrochemical cells, an ionically conductive medium common to the plurality of electrochemical cells and contacting the electrodes of each, and a controller coupled to the plurality of electrodes, said controller being configured to select between a number of different charging modes. The controller is configured to charge the electrochemical cell by either: (a) applying an electrical current between at least one charging electrode and a fuel electrode with the charging electrode(s) functioning as an anode and the fuel electrode functioning as a cathode, such that reducible metal fuel ions in the ionically conductive medium are reduced and electrodeposited as metal fuel in oxidizable form on the fuel electrode, or (b) applying an electrical current between at least one charging electrode and a fuel electrode as well as selectively apply the electrical current to at least one charging electrode, so as to increase uniformity of the metal fuel being electrodeposited on the fuel electrode by affecting the rate and density of the growth of the electrodeposited metal fuel on the fuel electrode. The method further comprises disconnecting the electrical current to discontinue the charging.

The controller is configured to select between charging modes that may include a standard charge mode, a higher uniformity mode, a higher charge convection mode, a parallel charging mode, and a mixed mode. The controller may also select between discharge modes.

Still another aspect provides a method of discharging an electrochemical cell system comprising a plurality of electrochemical cells. Each electrochemical cell in the system includes a fuel electrode, an oxidant electrode spaced apart from the fuel electrode, a first charging electrode positioned between the oxidant electrode and the fuel electrode, a second charging electrode positioned on the side of the oxidant electrode opposite the side facing the fuel electrode, and an ionically conductive medium common to the plurality of electrochemical cells and contacting the electrodes of each. A controller is coupled to the plurality of electrodes. The controller is configured to select between a number of different charging modes. The method includes: using the controller for discharging the electrochemical cell system and charging at least one of the plurality of electrochemical cells in the system for a period of time while the remaining electrochemical cells in the system are discharging. The charging of the at least one electrochemical cell comprises applying electrical current between one or more of the fuel electrodes at a cathodic potential and one of the charging electrodes at an anodic potential to generate convective flow in at least one electrochemical cell as oxygen is evolved from the ionically conductive medium and the fuel electrode is charged.

Another aspect provides an electrochemical cell having a fuel electrode, an oxidant electrode, an oxygen evolving electrode, an oxygen reduction air electrode exposed to external oxygen, and an aqueous ionically conductive medium common to and contacting each of the electrodes. The fuel electrode and the oxidant electrode are operable in a discharge mode wherein the fuel electrode functions as an anode and the oxidant electrode functions as a cathode to output electrical current. The oxygen evolving electrode and the oxidant reduction air electrode are operable to generate convective flow in the aqueous ionically conductive medium by application of current therebetween wherein the oxygen evolving electrode acts as an anode to evolve oxygen to generate convective flow in the cell by oxidizing a species thereof from the aqueous ionically conductive medium and the oxidant reduction air electrode acts as a cathode to reduce oxygen.

Yet still another aspect provides a method of discharging an electrochemical cell. The method includes operating the fuel electrode and the oxidant electrode of the cell in a discharge mode wherein the fuel electrode functions as an anode and the oxidant electrode functions as a cathode to output electrical current; and generating convective flow in the aqueous ionically conductive medium by application of current between the oxygen evolving electrode and the oxidant reduction air electrode of the cell. The oxygen evolving electrode acts as an anode to evolve oxygen by oxidizing a species thereof from the aqueous ionically conductive medium and the oxidant reduction air electrode acts as a cathode to reduce oxygen.

It is noted that during discharge, convection may be generated continuously or intermittently by choosing any of the modes described above using the controller.

Other features and advantages of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
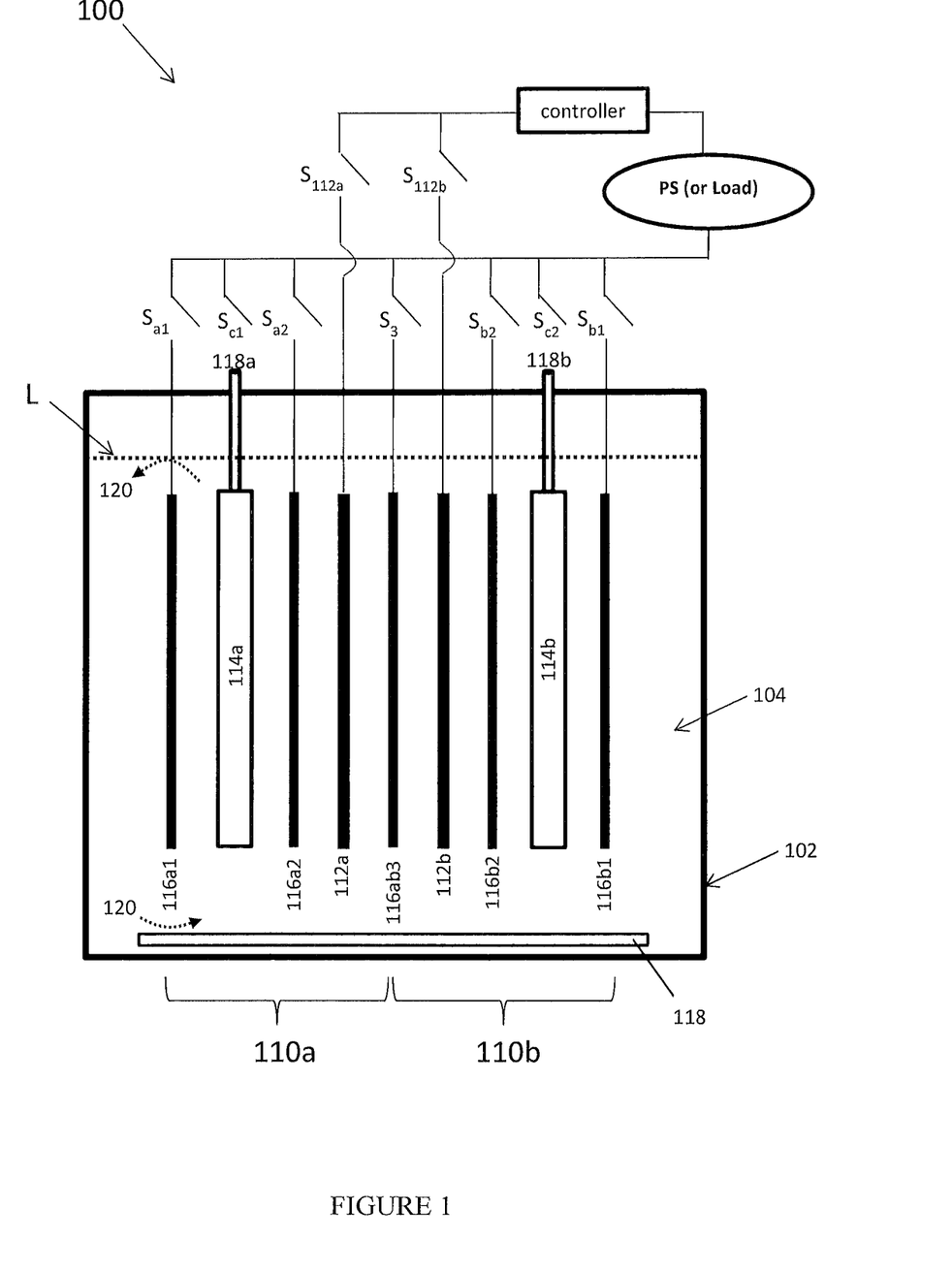
FIG. 1 depicts a cross-sectional, schematic view of an electrochemical cell system that comprises two electrochemical cells in accordance with an embodiment.

As a non-limiting exemplary embodiment of the invention, FIG. 1 illustrates a schematic cross sectional view of electrochemical cell system 100. As shown, the components of electrochemical cell system 100 may be contained at least partially in an associated housing 102 defining an interior cell chamber, generally depicted at 104, configured to contain a volume of ionically conductive medium therein. In an embodiment, discrete housings 102 may be linked to share the volume of ionically conductive liquid distributed across the housings 102, and may circulate between the housings 102 (e.g., driven by a fluid pump). In an embodiment, the system 100 utilizes a liquid ionically conductive medium that is contained within a common housing 102, and is configured to circulate therein to conduct ions within the cell system 100. More specifically, as further explained below, in accordance with embodiments, the common housing 102 is configured to house two cells 110a and 110b, or a bi-cell, such that the ionically conductive medium is common to both cells 110a and 110b. In an embodiment, the amount of liquid ionically conductive medium within the housing 102 may reach a level L. While at times the ionically conductive medium may be generally stationary within the housing 102, such as in a stagnant zone, it may be appreciated that the cell system 100 may be configured to create a convective flow of the ionically conductive medium. In some embodiments, the flow of the ionically conductive medium may be a convective flow generated by bubbles of evolved gas in the cell 100, such as is described in the U.S. Pat. Nos. 8,906,563 and 9,269,996 and U.S. Patent Application Publication No. 20130115523, each of which are incorporated herein in their entirety. Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the electrochemical cell system 100 may include elements or arrangements from one or more of U.S. Pat. Nos. 8,168,337; 8,309,259; 8,491,763; 8,492,052; 8,659,268; 8,877,391; 8,895,197; 8906563; 8,911,910; 9,105,910; 9,105,946; 9,178,207; 9,269,995; 9,269,996; U.S. Publication Numbers 20100316935; 20110070506; 20110250512; 20120321969; 20130115523; 20130115526; 20140091631; 20140227615; and 20150104679; each of which are incorporated herein in their entireties by reference.

In an embodiment of the cell system 100, such as that illustrated in FIG. 1, multiple cells 110 may be installed together in a common housing 102. Such an assembly may increase energy and/or power density, may facilitate desired flow directions based on the interaction of bubbles generated from each cell, and/or may reduce production costs by reducing the number of discrete parts therein or otherwise. The assembly of FIG. 1 contains two cells 110a and 110b therein (which may also be referred to as sub-cells), and thus the system may be referred to as bi-cell 100. It may be appreciated that the two sub-cells (individually cell 110a and 110b) define bi-cell 100, and are contained in a common ionically conductive medium, as illustrated in FIG. 1, although additional cells may also be included in other embodiments (i.e. forming a tri-cell, a quad-cell, a penta-cell, or so on). In other embodiments, each cell 110a and 110b may be housed in separate housings, each defining an interior cell chamber configured to contain a distinct volume of ionically conductive medium. The separate housings may be linked to share the volume of ionically conductive liquid distributed across the housings. In such a configuration, the cells may share common electronics, switches, circuitry and/or controller, for example.

In some embodiments, cells 110 may share common electrodes. In other embodiments, such as that shown in FIG. 1, each cell 110a and 110b contains its own associated fuel electrode 112a and 112b, oxidant electrode 114a and 114b, and charging electrodes 116a1, 116a2 and 116b1 and 116b2 (i.e., that may be spaced from one another). As depicted in FIG. 1, fuel electrode 112a, oxidant electrode 114a and charging electrodes 116a1 and 116a2 are associated with cell 110a. Similarly, fuel electrode 112b, oxidant electrode 114b and charging electrodes 116b1 and 116b2 are associated with cell 110b. Charging electrode 116ab3 is a common electrode shared by both cells 110a and 110b. In some embodiments, common charging electrode 116ab3 need not be present. In some embodiments, a fuel electrode 112 of one cell 110 may be understood as participating in electrochemical reactions with oxidant reduction electrodes 114 and/or charging electrodes 116 associated with other cells 110 (e.g. fuel electrode 112a associated with cell 110a may be coupled to oxidant reduction electrode 114b and/or charging electrode 116b associated with cell 110b). Although cells 110a and 110b are described as different cells, in one or more modes the electrodes thereof may collectively function as a single cell. For example, fuel electrodes 112a and 112b may discharge together and oxidant electrodes 114a and 114b may reduce an oxidant together. Cells 110a and 110b are described as different cells because, as will be discussed below, they can also be operated separately in one or more other modes. Thus, reference to these cells as different or separate does not mean they are entirely separate or different in an electrochemical sense in all modes. As will be mentioned below, cells that are different in an electrochemical sense may share common electrodes. For example, two oxidant electrodes sharing a common fuel electrode can still be two cells because there are different electrochemical couples.

Fuel electrodes 112a and 112b of cell system 100 may be supported in the interior cell chamber 104 so as to be contacted by the ionically conductive medium. In an embodiment, each fuel electrode 112a and 112b is a metal fuel electrode that functions as an anode when the cell system 100 operates in discharge, or electricity generating mode, and functions as a cathode when the cell system 100 operates in charge, or electricity consuming mode. The fuel may be provided to the bi-cell 100 as particles suspended in the ionically conductive medium. The fuel electrode may be provided as a permeable electrode body (mesh, screen, etc.). A permeable electrode body may include a screen that is made of any formation that is able to capture and retain, through electrodeposition, or otherwise, particles or ions of metal fuel from the ionically conductive medium that flows through or is otherwise present within the cell chamber 104. Further details regarding permeable electrode bodies, configurations and operation thereof may be described in U.S. Patent, Publication, and U.S. Pat. Nos. 8,168,337; 8,309,259; 8,659,268; 20110070506; U.S. Pat. Nos. 9,178,207; 9,105,946; 8,911,910; previously incorporated by reference above.

The fuel used in the cell 100 may be a metal, such as iron, zinc, aluminum, magnesium, lead, cadmium, nickel or lithium. By metal, this term is meant to encompass all elements regarded as metals on the periodic table, including but not limited to alkali metals, alkaline earth metals, lanthanides, actinides, semi-metals, "poor" metals, post-transition and transition metals, either in atomic, molecular (including metal hydrides), or alloy form when collected on the electrode body. However, the present invention is not intended to be limited to any specific fuel, and others may be used.

The illustrated embodiment of FIG. 1 depicts a single fuel electrode 112a and 112b associated with each cell 110a and 110b, however in some embodiments the fuel electrodes 112a and 112b may comprise a plurality of spaced apart permeable electrode bodies such as described in U.S. Pat. Nos. 8,309,259 and 8,911,910 and 9,178,207, which are incorporated herein by reference in their entirety. The electrode bodies may have different sizes so that a stepped scaffold configuration may be used, for example as described by U.S. Pat. No. 8,659,268 and incorporated by reference above, in other embodiments the electrodes may have substantially the same size. In some embodiments, a common fuel electrode may be the fuel electrode for a plurality of adjacent cells 110a, 110b. For example, in the illustrated embodiment, fuel electrode 112a and fuel electrode 112b may be replaced by a common fuel electrode shared by both cell 110a and cell 110b and common charging electrode 116ab3 need not be present.

The oxidant reduction electrodes 114a and 114b may be of any appropriate construction or configuration. In an embodiment, each oxidant reduction electrode 114a and 114b may generally be configured to support oxygen reduction in the electrochemical cell system 100, to create a potential difference with the fuel electrode 112a and 112b during discharge of the cell system 100. This oxidant reduction electrode may be used in a metal-air electrochemical cell. In other embodiments, the oxidant reduction may be configured for other types of electrochemical cell such as Ni—Zn, lead-acid, Ag—Zn, and Ni—Cd.

In an embodiment, each oxidant reduction electrode 114a and 114b may contain an active layer having meshes or coatings that may be characterized as "active material(s)". The active material(s) facilitate the electrochemical reactions associated with oxygen reduction. Accordingly, in an embodiment, the oxidant reduction electrodes 114a and 114b are positioned in the cell chamber 104 such that the active materials contact the ionically conductive medium allowing ions to be conducted to and/or from the fuel electrode 112a and 112b. In some embodiments, the active materials of the oxygen reduction electrode may be formed by a mixture of catalyst particles or materials, conductive matrix and hydrophobic materials, sintered to form a composite material or otherwise layered together. In various embodiments the active materials may be constructed of one or more metals and/or their oxides, such as but not limited to manganese, silver, nickel, platinum, lanthanum, strontium, and cobalt. For further details regarding oxidant electrodes, reference may be made to U.S. Patent Application Publication Nos. 20130115523, 20130022881, 20130115525, and 20130115526, previously incorporated herein in their entirety.

In an embodiment, the oxidant reduction electrodes 114a and 114b may be sealed or otherwise assembled into an oxidant reduction electrode module that is immersed into the ionically conductive medium in the cell chamber 104. At least one air channel (individually depicted as air channels 118a and 118b in FIG. 1) may extend into the oxidant reduction electrode module, so as to provide air or any other oxidant to the oxidant reduction electrodes 114a and 114b. Further details of such a configuration are described in U.S. Patent Application Publication No. 20130115523 previously incorporated by reference in its entirety herein.

As shown, in embodiments containing at least one separate charging electrode, the charging electrodes 116a1, 116a2 and 116b1 and 116b2 may be positioned at various locations. In the illustrated embodiment of FIG. 1, a charging electrode is positioned between each oxidant reduction electrode and fuel electrode. In particular, charging electrode 116a2 is positioned between oxidant reduction electrode 114a and fuel electrode 112a in cell 110a. Similarly, charging electrode 116b2 is positioned between oxidant reduction electrode 114b and fuel electrode 112b in cell 110b. This positioning prevents any dendrite formation from bridging from a fuel electrode 112a, 112b to its respective oxidant reduction electrode 114a, 114b. That is because fuel growth towards the oxidant reduction electrode 114a, 114b will contact the charging electrode 116a2 and 116b2 first, and thus short the fuel and charging electrodes. Among various functions, charging electrode 116a2 and 116b2 may also provide circulation via gas evolution of the ionically conductive medium via oxygen evolution during re-charging.

In addition, in the illustrated embodiment of FIG. 1, another separate charging electrode associated with each cell 110a and 110b is positioned on the distal side of the oxidant reduction electrode that is opposite the side facing the fuel electrode. Namely, charging electrode 116a1 is positioned on the distal side of oxidant reduction electrode 114a that is opposite the side facing fuel electrode 112a in cell 110a.

Similarly, charging electrode 116b1 is positioned on the distal side of oxidant reduction electrode 114b that is opposite the side facing fuel electrode 112b in cell 110b. The position of charging electrodes 116a1 and 116b1 on the distal side of the oxidant reduction electrode 114a and 114b enables application of electrical current to each charging electrode 116a1 and 116b1 such that each second charging electrode may function as the anode and the fuel electrodes 112a and 112b may function as the cathode. Among various functions, charging electrodes 116a1 and 116b1 may also affect circulation of the ionically conductive medium.

The illustrated embodiment of FIG. 1 further includes a common charging electrode 116ab3 positioned between fuel electrodes 112a and 112b. Charging electrode 116ab3 provides a more uniform electric field for fuel electrodes 112a and 112b and is also capable of reducing or blocking rough or dendritic growth between the fuel electrodes.

As with the fuel electrodes 112a and 112b, the charging electrodes 116a2 and 116b2 and 116a1 and 116b1 may be positioned within the cell chamber 104, so as to be in contact with the ionically conductive medium. The charging electrodes 116a1, 116a2 and 116b1, 116b2 may be configured to participate in the oxidation of an oxidizable oxidant species, which is present in the liquid ionically conductive medium, so as to promote the reduction of an oxidized metal fuel species and growth of the metal fuel on the fuel electrodes 112a and 112b during charging of each cell 110a and 110b. Accordingly, in some embodiments, the charging electrodes 116a2 and 116b2 may be characterized as an oxygen evolving electrode, due to gaseous species ($O_2$) formed during the reduction process at the charging electrode 116a2 and 116b2 during the charging of the electrochemical cells 110a and 110.

Bubbles formed during charging may rise from where they are evolved on the charging electrodes 116a1, 116a2 and 116b1, 116b2 towards the liquid electrolyte level L, and develop a flow of the ionically conductive medium. In an embodiment, a flow pattern which is generally depicted by arrows 120 may be formed. Various other flow patterns of the ionically conductive medium are also possible, for example, such as those described in U.S. Pat. Nos. 8,906,563 and 9,269,996, previously incorporated herein in their entirety. Furthermore, although not illustrated in FIG. 1, in some embodiments, diffusers, flow diverters or other flow modifying bodies may be implemented. The flow pattern formed may depend on which charging electrodes are receiving an anodic potential to evolve a gaseous species (e.g., $O_2$), and thus different flow patterns can be created in different modes.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, lithium hydroxide or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. Pat. No. 8,895,197, previously incorporated by reference above. In some embodiments, additives may be added to the ionically conductive medium, including but not limited to additives that enhance the electrodeposition process of the metal fuel on fuel electrodes 112a and 112b, such as is described in U.S. Pat. No. 8,877,391 and Publication No. 20120321969, previously incorporated by reference above. Such additives may control dendritic growth of fuel particles, reduce the likelihood of fuel particles separating from fuel electrodes 112a and 112b during discharge and/or create an undesirable electrical contact between electrodes internal to the cell system 100, for example.

In various non-limiting embodiments, each fuel electrode 112a and 112b, each oxidant reduction electrode 114a and 114b, and each separate charging electrode 116a1, 116a2, 116b1, 116b2 may be connected by a switching system (schematically depicted in FIG. 1) that may be configured to connect each cell 110a and 110b and cell system 100 to a power supply PS, a load, or other cells in series and/or parallel. It should be understood by one of ordinary skill in the art that the load is an external load and, may, for example, take the place of the illustrated power supply PS during discharge.

During discharge, fuel electrodes 112a and 112b are connected to the load, and operate as anodes so that electrons given off by the metal fuel, as the fuel is oxidized at the fuel electrodes 112a and 112b, flows to the external load. The oxidant reduction electrodes 114a and 114b function as cathodes during discharge, and are configured to receive electrons from the external load and reduce an oxidizer that contacts oxidant reduction electrodes 114a and 114b, specifically oxygen in the air surrounding cells 110a and 110b, oxygen being fed into cells 110a and 110b, or oxygen recycled from cells 110a and 110b.

Discharge reaction can also comprise of a fuel electrode that oxidizes fuel and an oxidant electrode that takes part in reduction reaction. These reactions include electrochemical reactions that occur in battery cells such as Pb-acid, Ni—Zn, Ni—Cd, Ni—Fe batteries, but is not limited to these batteries. An example embodiment is described is greater detail below with reference to FIG. 3.

During charge, each fuel electrode 112a and 112b is connected to the power supply PS via switches $S_{112a}$ and $S_{112b}$, respectively, and operate as cathodes so that a fuel species (e.g., oxidized fuel ions) within the ionically conductive medium is reduced and electrodeposited at fuel electrodes 112a and 112b. The charging electrodes 116a2 and 116b2 are coupled to the power supply PS by switches $S_{c1}$ and $S_{c2}$ to function as anodes during charge, and oxidize the oxidant species (e.g., reduced oxygen ions) in the ionically conductive medium that contacts charging electrodes 116a2 and 116b2, specifically evolving oxygen into the ionically conductive medium. Various switching system configurations and operations thereof are possible, for example, such as those described in U.S. Pat. Nos. 8,309,259, 8,911,910, 9,105,946, and 9,178,207 and U.S. Application Publication Nos. 20110070506 and 20110250512; previously incorporated herein in their entirety.

In the embodiment illustrated in FIG. 1, switches $S_{a1}$, $S_{a2}$, $S_3$, $S_{b2}$, and $S_{b1}$ are associated with charging electrodes 116a1, 116a2, 116a3, 116b2, and 116b1, respectively. Switches $S_{112a}$ and $S_{112b}$ are associated with fuel electrodes 112a and 112b respectively. Switches $S_{c1}$ and $S_{c2}$ are associated with the charging electrodes and may provide electrical current to the charging electrode(s) and/or between charging electrode(s) and the oxidant electrode(s). The switches provide (or limit) electrical connection between the electrodes and the controller, power supply PS, and/or load. The depiction of the switches in FIG. 1 is schematic representation only, and thus is not intended to limit any position, location, or association of the switches (with a respective electrode).

The switches $S_{a1}$, $S_{a2}$, $S_3$, $S_{b2}$, $S_{b1}$, $S_{c1}$, $S_{c2}$, $S_{112a}$, and $S_{112b}$ may be controlled by a controller. That is, the controller is configured to control an open state and a close state for each of the switches. As explained in further detail below, during a charging mode, the controller is configured to apply an electrical current (from power supply PS) between at least one charging electrode and a fuel electrode with the charging electrode(s) functioning as an anode and the fuel electrode functioning as a cathode, such that reducible metal fuel ions in the ionically conductive medium are reduced and electrodeposited as metal fuel in oxidizable form on the fuel electrode. The controller is configured to selectively apply the electrical current to at least one charging electrode, based on at least one input parameter, so as to increase uniformity of the metal fuel being electrodeposited on the fuel electrode by affecting the rate and density of the growth of the electrodeposited metal fuel on the fuel electrode. The controller may be of any construction and configuration. It may comprise hard-wired circuitry that simply manipulates the switches based on an input determining whether the cell should be in discharge or charge mode. The controller may also include a microprocessor for executing more complex decisions, as an option. The controller may also function to manage connectivity between the load and the power supply PS.

The controller may also be operatively connected to a sensor (not shown in FIG. 1). The sensor may sense a condition of the electrochemical cell including a voltage, a cumulative charge capacity, an impedance, a current, and a resistance. The sensor may sense other conditions of the electrochemical cell. The controller may use the condition sensed by the sensor as an input in determining operation of the cell. The controller may alternatively use an input parameter entered by a user to operate the cell. The controller may be configured to compare a cell property to a limit parameter. The cell property may include a voltage, a cumulative charge capacity, an impedance between electrodes, a slope of electrode voltages, a rate of slope change, a current, a resistance to a sensing electrode, or a shorting event.

In any embodiment, the switches $S_{a1}$, $S_{a2}$, $S_3$, $S_{b2}$, $S_{b1}$, $S_{c1}$, $S_{c2}$, $S_{112a}$, and $S_{112b}$ (or any other switch described herein) may be of any type, and the term switch is broadly intended to describe any device capable of switching between the modes or states described. For example, any or all of the switches $S_{a1}$, $S_{a2}$, $S_3$, $S_{b2}$, $S_{b1}$, $S_{c1}$, $S_{c2}$, $S_{112a}$, and $S_{112b}$ may be of single pole single throw type as shown in the embodiment of FIG. 1. The switches may be of the pivoting, sliding or latching relay type. Also, semiconductor based or other solid state switches may be used as well. The switches may be activated electrically (electromechanical relay) or magnetically or by other methods known to those familiar in the art. Any other suitable type of switch may be used, and the examples herein are not limiting.

It may be appreciated that the electrochemical reactions occurring during charging and discharging of the cell system 100 may be reduction-oxidation (redox) reactions. For example, in an embodiment where the metal fuel is zinc, the ionically conductive medium may contain reducible zinc ions that are to be plated as zinc fuel on the fuel electrodes 112a and 112b. In one such embodiment, the reduction reaction takes place at fuel electrode 112 (the reduction site), and may conform to $Zn(OH)_4^{2-}+2e^-\rightarrow Zn+4OH^-$. The corresponding oxidation reaction occurs at charging electrodes 116a2 and 116b2, and may conform to $2OH^-\rightarrow H_2O+\frac{1}{2}O_2+2e^-$. The charging electrodes 116a2 and 116b2 are therefore understood to be producing oxygen gas within the cell system 100, and thus may be characterized as an oxygen evolving electrode. It may be appreciated that in some embodiments different metal fuels are utilized, and thus other reactions may occur, which may also evolve oxygen or other gases in cell system 100. As another example, the fuel electrode may be Zn and the charging electrode may be characterized as a nickel electrode forming a Ni—Zn electrochemical cell. For example, the charging electrode reaction may also conform to: $2NiOOH+2H_2O+2e^-\rightarrow 2Ni(OH)_2+2OH^-$.

In an embodiment where the metal fuel is zinc, the oxidation reaction may correspond to the equation $Zn\rightarrow Zn^{2+}+2e^-$. The zinc ions may bond with hydroxide ions in the ionically conductive medium, in a manner that corresponds to $Zn^{2+}+4OH^-\rightarrow Zn(OH)_4^{2-}$. The zincate ($Zn(OH)_4^{2-}$) could then flow in the ionically conductive medium, and be available for reduction to zinc fuel at fuel electrodes 112a and 112b during a future charging of cell system 100. The oxidized zinc may also form a zinc oxide precipitate (ZnO) in the ionically conductive medium.

Fuel growth and consumption during the charging and discharging of the cell 100 may be affected by various factors, One such factor is the distribution of the electric current about the fuel electrode. In particular, the electric field setup about a fuel electrode could affect the thickness and uniformity of the electroplated metal on the electrode. For example, edges and corners of the fuel electrode are generally characterized by higher electric fields which translate to higher potentials, higher metal fuel electrodeposition rates and thus, a higher probability for dendrite formation. As described below, the current distribution in a cell may be controlled by suitable positioning of the fuel electrode in relation to the charging electrode(s) to homogenize and reduce high current densities in particular regions which in turn lowers the electrodeposition rate at corners and protrusions, thereby leveling the metal fuel plated layer such that a deposit of more uniform thickness on the fuel electrode may be formed.

As will be discussed in further detail below, the plurality of switches $S_{a1}$, $S_{a2}$, $S_3$, $S_{b2}$, $S_{b1}$, $S_{c1}$, $S_{c2}$, $S_{112a}$, and $S_{112b}$ may be controlled by the controller such that the cells 110a and 110b within the system 100 may operate in various charging modes to control the electric field within the cell. The movement of the switches to the closed position provides electrical current from the power supply PS, for example, to the respective electrode. The charging modes include (each with a cathodic potential applied to the fuel electrodes being charged):

(1) A standard charging mode. In the standard mode, the switches are configured such that an electrical current of anodic potential is applied to the charging electrode 116a2, 116b2 that is positioned between the fuel electrodes 112a, 112b and oxidant reduction electrodes 114a, 114b. In addition, electric current of cathodic potential is applied to the fuel electrodes, 112a, 112b, Each charging electrode 116a2, 116b2 functions as the anode and fuel electrodes 112a, 112b each function as the cathode such that the reducible metal fuel ions are reduced and electrodeposited on fuel electrodes 112a and 112b. In the embodiment of FIG. 1, for cell 110a, switch $S_{a2}$ is closed such that the electrical current is applied to charging electrode 116a2. Also, switch $S_{112a}$ is closed such that electrical current of cathodic potential is applied from the power supply PS to fuel electrode 112a. Charging electrode 116a2 functions as the anode and fuel electrode 112a functions as the cathode such that the reducible metal fuel ions are reduced and electrodeposited on fuel electrode 112a. Similarly, for cell 110b, switch $S_{b2}$ is closed such that the electrical current is applied to charging electrode 116b2. Switch $S_{112b}$ is closed such that electrical current of cathodic potential is applied from the power supply PS to fuel electrode 112b. Charging electrode 116b2 functions as the anode and fuel electrode 112b functions as the cathode such that the reducible metal fuel ions are reduced and electrodeposited on fuel electrode 112b. Switches $S_{a2}$ and $S_{b2}$ may couple to a common current shared by both charging electrodes 116a2 and 116b2.

(2) A higher uniformity mode. In the higher uniformity mode, the switches are configured such that a constant electrical current of anodic potential is again applied to the charging electrodes 116a2, 116b2 that are positioned between the fuel electrodes 112a and 112b and oxidant reduction electrodes 114a and 114b of cathodic potential to the fuel electrodes 112a, 112b, as is the case with the standard charging mode. Additionally, an intermittent or constant electrical current of cathodic potential is applied to the charging electrode 116ab3 that is positioned between the fuel electrodes 112a and 112b of cells 110a and 110b. In the embodiment of FIG. 1, switches $S_{a2}$ and $S_{b2}$ are closed such that electrical current is applied to charging electrodes 116a2 and 116b2, as discussed above in the standard charging mode (1). Switches $S_{112a}$ and $S_{112b}$ are closed such that electrical current of cathodic potential is applied from the power supply PS to fuel electrodes 112a and 112b (respectively). In one embodiment, switch $S_3$ is intermittently opened and closed in a pulsed manner by the controller such that electrical current is applied to charging electrode 116ab3 intermittently. Alternatively, in an embodiment, switch $S_3$ may be left in a closed state for a period of time so that the electrical current is applied to charging electrode 116ab3 constantly. The electrical current to charging electrode 116ab3 alters the electric field about fuel electrodes 112a and 112b to increase the uniformity of distribution of the current density to yield a more uniform metal fuel electrodeposit on fuel electrodes 112a and 112b.

(3) A higher convection charging mode. In the higher convection charging mode, the switches are configured such that an electrical current of anodic potential is applied to the charging electrodes 116a1, 116b1 that are each positioned on the distal side of their associated (respective) oxidant reduction electrode 114a, 114b that is opposite the side facing the fuel electrode 112a, 112b. Each charging electrode 116a1, 116b1 functions as the anode and each fuel electrode 112a, 112b functions as the cathode such that the reducible metal fuel ions are reduced and electrodeposited on fuel electrodes 112a and 112b. In the embodiment of FIG. 1, for cell 110a, switch $S_{a1}$ is closed such that the electrical current is applied to charging electrode 116a1. Also, switch $S_{112a}$ is closed such that electrical current of cathodic potential is applied from the power supply PS to fuel electrode 112a. Charging electrode 116a1 functions as the anode and fuel electrode 112a functions as the cathode such that the reducible metal fuel ions are reduced and electrodeposited on fuel electrode 112a. Similarly, for cell 110b, switch $S_{b1}$ is closed such that the electrical current is applied to charging electrode 116b1, and switch $S_{112b}$ is closed such that electrical current of cathodic potential is applied from the power supply PS to fuel electrode 112b. Charging electrode 116b1 functions as the anode and fuel electrode 112b functions as the cathode such that the reducible metal fuel ions are reduced and electrodeposited on fuel electrode 112b. Distal charging electrodes 116a1 and 116b1 may generate bubbles of evolved gas in the cell resulting in a convective flow of the ionically conductive medium. Bubbles formed during charging of charging electrodes 116a and 116b1 may rise from where they are evolved on the charging electrode 116a and 116b1 towards the liquid electrolyte level L and develop a flow of the ionically conductive medium. The higher convection charging mode may prevent local stagnation of the electrolyte as a means to promote more uniform metal fuel deposition on the fuel electrodes 112a and 112b and avoiding concentration gradients of metal fuel ions within the cell. In some embodiments, switches $S_{a1}$ and $S_{b1}$ may be closed continuously, and, in other embodiments, switches $S_{a1}$ and $S_{b1}$ may be closed intermittently, e.g., based on an elapsed time, a voltage measurement, a current measurement, a conductivity measurement, an impedance measurement, a user command, or a combination thereof. The switches $S_{a1}$ and $S_{b1}$ may be controlled together or separately. For example, in some embodiments, such as in higher convection charging mode, switch $S_{a2}$ may be (intermittingly) closed (i.e., thus charging electrode 116a2 is active) along with switch $S_{a1}$ while switch $S_{b1}$ is (intermittingly) open, thus supplementing the convective flow produced by charging electrode 116a1. Similarly, switch $S_{b2}$ may be (intermittingly) closed (i.e., thus charging electrode 116b2 is active) along with switch $S_{b1}$ while switch $S_{a1}$ is open, thus supplementing the convective flow produced by charging electrode 116b1. As such, the electrolyte may be mixed behind the respective cathode (i.e., fuel electrode 112a or 112b) during the time such switches are closed.

(4) A parallel charging mode. In the parallel charging mode, an electrical charge is applied simultaneously to all of the charging electrodes 116a1, 116a2, 116ab3, 116b1, and 116b2. In the embodiment of FIG. 1, switches $S_{a1}$, $S_{a2}$, $S_3$, $S_{b2}$, and $S_{b1}$ are closed. Switches $S_{112a}$ and $S_{112b}$ are also closed. The electrical current from the power source PS is applied simultaneously to each of the plurality of charging electrodes 116a1, 116a2, 116ab3, 116b1, and 116b2 (functioning as the anodes) and each of the fuel electrodes 112a and 112b (functioning as the cathodes) such that the reducible metal fuel ions are reduced and electrodeposited on fuel electrodes 112a and 112b. Not to be bound by any particular theory, but this mode may provide a lower charge voltage and thus higher efficiency. This may be potentially at the expense of uniformity in the metal fuel electrodeposit on the anode screen as compared to uniformity mode.

(5) A mixed mode. In mixed mode, the switches are configured such that one of the cells—e.g., cell 110a—is being charged while the other—e.g., cell 110b—is discharged. For example, an electrical current of anodic potential is applied to the charging electrode 116a2 (thus functioning as the anode) and an electrical current of cathodic potential is applied to a single fuel electrode 112a of cell 110a in the system 100, so that the selected single fuel electrode 112a functions as the cathode and such that the reducible metal fuel ions are reduced and electrodeposited on the selected fuel electrode 112a. In the embodiment of FIG. 1, for cell 110a, switch $S_{a2}$ is closed such that the electrical current is applied to charging electrode 116a2. Switch $S_{112a}$ is closed such that electrical current of cathodic potential is applied from the power supply PS to fuel electrode 112a. While the switch $S_{112a}$ associated with fuel electrode 112a is closed to provide the electrical current thereto, the switch $S_{112b}$ associated with the fuel electrode 112b is open or connected to the external load, so that fuel electrode 112b is discharging. That is, metal fuel is oxidized at fuel electrode 112b, so that fuel electrode 112b operates as an anode, and an oxidant is reduced at the oxidant electrode 114b (which operates as a cathode during discharge of cell 110b), to generate an electrical discharge current therebetween for application to the load. For example, when a cell needs to be reset, operating in this mixed mode may charge one side (e.g., 110a) either to half or full capacity (while the other side is reset/discharged) (e.g., 110*b* is discharged). In such a case, the fuel electrode 112*b* may be reset in low concentrations thereby avoiding reducing passivation as well as dissolving any passivated oxide. This gives a cleaner reset while operating predominantly in a higher power/efficiency mode with both anodes charging and discharging together (creating a lower IR loss). It may be appreciated to one skilled in the art that this mode may decrease the overpotential thereby improving metal fuel electrodeposit uniformity. In this mixed mode, the switches $S_{a2}$ or $S_{b2}$ may be closed to provide the electrical current to either of the charging electrodes 116*a*2 or 116*b*2 until at least one input parameter relating to the state of a charging electrode dictates distribution into a conditioning unit. Then, the switch $S_{a2}$ or $S_{b2}$ may be subsequently opened to discontinue electrical current to the charging electrode in the conditioning unit.

As a variation of the above, in one embodiment, the switches $S_{a2}$ and $S_{b2}$ are configured such that an electrical current of anodic potential is applied to both charging electrodes 116*a*2 and 116*b*2 and an electrical current of cathodic potential is applied to a single fuel electrode (either 112*a* or 112*b*) in the system 100, so that the selected single fuel electrode functions as the cathode and such that the reducible metal fuel ions are reduced and electrodeposited on the selected fuel electrode. In the embodiment of FIG. 1, as an example, switches $S_{a2}$ and $S_{b2}$ are closed such that the electrical current is applied to charging electrodes 116*a*2 and 116*b*2. Switch $S_{112a}$ is closed such that electrical current of cathodic potential is applied from the power supply PS to fuel electrode 112*a*, Accordingly, charging electrodes 116*a*2 and 116*b*2 may each function as the anode and fuel electrode 112*a* functions as the cathode such that the reducible metal fuel ions are reduced and electrodeposited on the selected fuel electrode 112*a*. While the switch $S_{112a}$ associated with fuel electrode 112*a* is closed to provide the electrical current thereto, the switch $S_{112b}$ associated with the fuel electrode 112*b* is open or connected to the external load, so that fuel electrode 112*b* is discharging. That is, the metal fuel is oxidized at fuel electrode 112*b*, so that fuel electrode 112*b* operates as an anode, and an oxidant is reduced at the oxidant electrode 114*b*, which operates as a cathode during discharge of cell 110*b*, to generate an electrical discharge current therebetween for application to the load. Thus, for example, when a cell needs to be reset, operating in this mixed mode may charge one side (e.g., 110*a*) either to half or full capacity (while the other side is reset/discharged) (e.g., 110*b* is discharged). In such a case, the fuel electrode 112*b* may be reset in low concentrations thereby avoiding reducing passivation as well as dissolving any passivated oxide. Also, in this mode, the switches $S_{a2}$ and $S_{b2}$ may be closed to provide the electrical current to each of the charging electrodes 116*a*2 and 116*b*2 until at least one input parameter relating to the state of a first charging electrode dictates distribution into a conditioning unit, and then subsequently opened to discontinue electrical current to the first charging electrode in the conditioning unit.

Conversely, in a mixed discharging mode, the switches are configured such that an electrical current of cathodic potential is applied to one or both of the oxidant electrodes 114*a* and/or 114*b* (e.g., via switches $S_{c2}$ and/or $S_{c2}$), so that either or both of the oxidant electrodes 114*a* and/or 114*b* functions as the cathode, and a single fuel electrode (112*a*) functions as the anode, such that metal fuel is oxidized on the selected/single fuel electrode (112*a*). The other of the fuel electrodes (112*b*) discharges during application of electrical current of anodic potential to the fuel electrode (112*a*).

Further details of such mixed mode configurations are described in U.S. Patent Publication No. 20150228991, which is incorporated herein by reference in its entirety.

Figure 2:
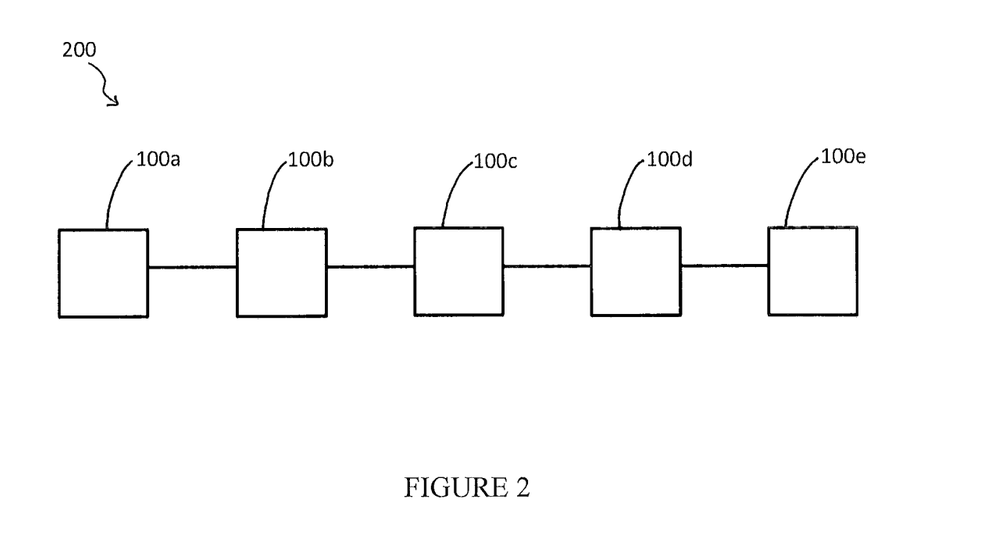
FIG. 2 depicts a system comprising multiple connected bi-cells or connected systems as depicted in FIG. 1, in accordance with an embodiment.

Furthermore, a plurality of switches for a number of cells may be controlled by the controller such that each cell 100 within a system containing a number of cells may be controlled. For example, as schematically represented in FIG. 2, a system 200 may include a plurality of cells 100*a*, 100*b*, 100*c*, 100*d*, 100*e*, etc., that are connected, for example, in series. Although five cells are shown in FIG. 2, such depiction is not intended to be limiting. The system 200 may include two cells, for example, or twenty cells. The cells may be the bi-cells shown in FIG. 1, or cells with other configurations of electrode sets therein.

Each cell 100*a*, 100*b*, etc. itself and/or the entire system 200 of cells may be controlled using a number of discharge modes. As previously noted, in a standard discharging mode for a single cell, each fuel electrode 112*a* and 112*b* functions as an anode when the cell system 100 operates in discharge, or electricity generating mode. However, the system 200 of cells 100*a*, 100*b*, etc. may be controlled using a number of discharge modes. When the system 200 is being discharged, the fuel electrodes (e.g., 112*a* (and optionally 112*b*)) of each cell 100*a*, 100*b*, etc. are connected to the load, and operate as anodes so that electrons given off by the metal fuel, as the fuel is oxidized at the fuel electrodes, flows to the external load. The oxidant reduction electrodes (e.g., 114*a* (and optionally 114*b*)) of each cell 100*a*, 100*b*, function as the cathode during discharge, and are configured to receive electrons from the external load and reduce an oxidizer that contacts oxidant reduction electrodes. The discharging modes of the system 200 may include (with the fuel electrodes being connected to the load and operating as anodes in each mode):

(1) The discharge modes discussed above, including a continuous discharge mode where the fuel electrodes of some (a partial continuous discharge mode) or all (a full continuous discharge mode) are continuously discharged.

(2) A discharge/intermittent convection mode. In such a mode, the system 200 of cells 100*a*, 100*b*, etc. is discharging. During the system discharge, at least one of the cells, e.g., cell 100*a*, is taken offline or bypassed for a brief period of time (shorter than the discharging time) and placed in a charge mode by delivery of current thereto during that brief period, to create convection in that particular cell, with some fuel electrodeposition also occurring. In one embodiment, each cell may be periodically charged, or charged in succession, for example, for such brief period of time, while the remaining cells in the system 200 discharge during the charging of the selected cell. In another embodiment, more than one of the cells, e.g., 100*a* and 100*b*, may be charged for the brief period of time while the remaining cells in the system 200 are discharged. Accordingly, the controller may be used to bypass the selected cell (or charge the selected cell) by controlling switches associated with that cell (e.g., switches $S_{a1}$, $S_{a2}$, $S_3$, $S_{b2}$, $S_{b1}$, $S_{c1}$, $S_{c2}$, $S_{112a}$, and $S_{112b}$). The charge mode for charging the selected cell(s) during discharging of the system 200 may be any one of the previously mentioned charge modes (1)-(5), for example. Examples of applying a charge to one cell while another cell operates as a cathode are also described in U.S. Pat. Nos. 9,105,946 and 9,214,830 and U.S. Publication No. 20160064789, which are all incorporated by reference in there entireties.

As a variant or alternative discharge/intermittent convection mode, the system 200 of cells 100*a*, 100*b*, etc. is discharging similarly, but the convection is created differently. During the system discharge, at least one of the cells is taken offline or bypassed for a brief period of time (shorter than the discharging time) to create convection in that particular cell by applying current between one or more of the fuel electrodes at a cathodic potential and one or more of the charging electrode(s) at anodic potential. Accordingly, as seen in FIG. 1 as an example, switches $S_{c1}$ and $S_{c2}$ may be associated with the oxidant electrodes 114a and 114b, for such purposes. For example, controller may be configured to apply the electrical current with a cathodic potential to one or both oxidant electrodes 114a and 114b by closing switches $S_{c1}$ and/or $S_{c2}$ and any of the switches of the charging electrodes to apply an anodic potential thereto. The result is that gaseous oxygen is evolved by the charging electrode(s) from the aqueous electrolyte (e.g., from water or OH— ions) to generate convective flow in the cell. But the oxygen reduction counter-reaction at the oxidant reduction electrode(s) replenishes the oxygen species content to reduce electrolyte breakdown/loss. As such, this mode may be utilized to create an oxygen pump within a cell for periodic convection without charging the fuel electrode.

In accordance with another embodiment, a dedicated charging electrode 118 is provided within the housing 102 of the cell 100 and configured to act only as an anode during discharge to provide mixing via convection. As shown in the FIG. 1 example, the dedicated charging electrode 118 may be provided on a bottom of the housing and extend relative to the vertically positioned fuel electrodes and charging electrodes of the cells 110a and 110b. In another embodiment, the dedicated charging electrode 118 may be provided near a top or side of the housing 102. When this embodiment is used for the discharge/intermittent convection mode discussed above, the controller applies an electrical current of anodic potential to the dedicated charging electrode 118 (e.g., via a switch; not shown in FIG. 1). One or more of the oxidant reduction electrodes may serve as the counter-electrode of cathodic potential for that reaction. This is the same as described in the immediately preceding discharge/intermittent convection mode variant. The dedicated charging electrode 118 allows it to be optionally tailored to these short bursts, if desired, as opposed to far longer term charging.

The above description of the various charging modes is provided with particular respect to the cell embodiment shown in FIG. 1. The modes of operation are, however, not limited to the configuration shown in the non-limiting exemplary embodiment and may be applied to other embodiments, including cells with one fuel electrode or more than two sub-cells. Similarly, the modes of discharging as described with reference to the bi-cell and/or the system 200 are not intended to be limited.

Figure 3:
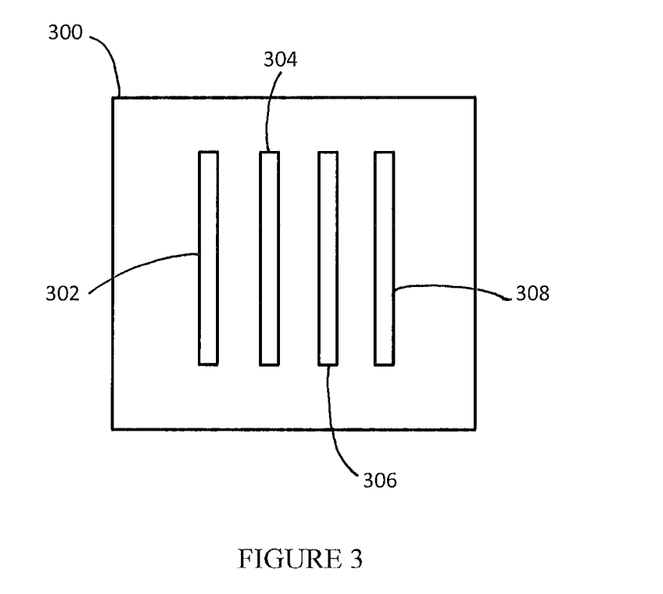
FIG. 3 depicts a schematic view of a battery in accordance with an embodiment

For example, the use of a dedicated electrode 118 is not limited to use in the illustrated bi-cell of FIG. 1. In accordance with an embodiment, a dedicated electrode purely for mixing via internal convection during discharge may be implemented in a nickel-Zinc (Ni—Zn) or lead acid battery or any other electrode pairs in an aqueous electrolyte solution. FIG. 3 illustrates an example schematic of a Ni—Zn battery 300 having an oxygen evolving electrode 306 and an oxidant reduction air electrode 308 provided in its housing with a nickel electrode 302 and a zinc electrode 304 both for providing discharge power from the cell as well as to generate convective flow in the cell. The zinc electrode 304 acts as the anode and the nickel electrode 302 acts as the cathode during discharge to generate output current to a load (not shown). Conversely, current input from a power supply (not shown) is applied to the zinc electrode 304 as a cathode to electroplate zinc thereon, and to the nickel electrode 302 as an anode to reduce nickel. This Ni—Zn functionality is conventional, and any other electrode pairs may be used as well.

The oxygen evolving electrode 306 and the oxidant reduction air electrode 308 are used to generate a convective flow via the oxygen gas evolved by the electrode 306. The oxidant reduction air electrode 308 is the same as in previous embodiments, and reduces oxygen, e.g., from air, when acting as a cathode. Thus, a controller can deliver current from a power supply (which may be drawn from the discharge of the cell itself, other cells, or an external source) to apply an anodic potential to the oxygen evolving electrode 306 to oxidize an oxygen species from the aqueous electrolyte solution (i.e., ionically conductive medium) and to evolve oxygen bubbles to create convective flow in the aqueous electrolyte solution, and a cathodic potential to the oxidant reduction air electrode 308 to reduce oxygen and supply the reduced species thereof to the electrolyte solution. This allows the convective flow to be created without depleting oxygen species from the electrolyte solution and degrading the same. This creates an oxygen pump within the cell as in the other embodiments. The oxygen evolution action can optionally take place while the other electrodes are discharging to create convective flow during discharge, if desired. This helps to increase the efficiency of discharge, especially for discharges of longer duration.

In accordance with an embodiment, during discharge, convection may be generated continuously or intermittently (using the controller) by choosing any of the modes described above.

Each of the above-described discharge modes enable internal convention without decomposition of the ionically conductive medium/electrolyte, since the $O_2$ (bubbles) is produced from the oxidant electrode 114a, 114b.

In an embodiment, any of the previously described charging modes, e.g., modes (1) to (3), may be applied to electrodes in a single cell (e.g., 110a), while the other cell (110b) is disconnected. That is, for one cell, e.g., 110a, in any of the modes (1) to (3), an electrical current of anodic potential is applied to the charging electrode 116a2 or 116a1 (as previously described) while an electric current of cathodic potential is applied to the fuel electrode 112a, by connecting the corresponding switches to the power source. The electrodes in cell 100b are disconnected and receive no electrical current (e.g., no switches connected to the power source or load).

The foregoing illustrated embodiments have been provided solely for illustrating the structural and functional principles of the present invention and are not intended to be limiting. For example, the present invention may be practiced using a variety of fuels, oxidizers, electrolytes, and/or overall structural configurations or materials. Thus, the present invention is intended to encompass all modifications, substitutions, alterations, and equivalents within the spirit and scope of the following appended claims.

What is claimed:
1. An electrochemical cell system comprising:
a plurality of electrochemical cells, wherein each electrochemical cell comprises:
a set of electrodes comprising:
a fuel electrode;
an oxidant electrode spaced apart from the fuel electrode;
a first charging electrode positioned between the oxidant electrode and the fuel electrode;

a second charging electrode positioned on the side of the oxidant electrode opposite the side facing the fuel electrode;
a third charging electrode positioned between the fuel electrodes of separate electrochemical cells;
the plurality of electrochemical cells being arranged such that the fuel electrode of the set of electrodes in each electrochemical cell is positioned closest to the third charging electrode in the electrochemical cell system;
an ionically conductive medium common to the plurality of electrochemical cells and contacting the set of electrodes of each electrochemical cell; and
a plurality of switches, each switch being associated with one of the electrodes and operatively coupled to a controller, wherein one or more of the first charging electrode and the second charging electrode is electrically connected through a switch and one or more fuel electrodes is electrically connected through a switch, wherein the controller is configured to select between charge modes, wherein the controller is configured to control discharge and charge operations of the cells by controlling an open state and a closed state for each switch of the plurality of switches, such that at least one of the plurality of switches is in an open state and at least one of the plurality of switches is in a closed state during each of the discharge and charge operations, wherein the third charging electrode is configured to be continuously or intermittently electrically connected through a switch, and wherein one of the charge modes is a mode for increasing uniformity of metal fuel being electrodeposited on the fuel electrode, wherein:
one or more first switches associated with each first charging electrode are closed to provide the electrical current to each first charging electrode,
one or more second switches associated with each fuel electrode are closed to provide the electrical current to each fuel electrode, and
a third switch associated with the third charging electrode is continuously or intermittently closed to provide the electrical current to the third charging electrode.

2. The electrochemical cell system according to claim 1, wherein said controller is configured to:
in a standard charge mode, apply an electrical current between at least one charging electrode and a fuel electrode, with the charging electrode(s) functioning as an anode and the fuel electrode functioning as a cathode, such that reducible metal fuel ions in the ionically conductive medium are reduced and electrodeposited as metal fuel in oxidizable form on the fuel electrode.

3. The electrochemical cell system according to claim 1, wherein the plurality of electrochemical cells are connected in series.

4. The electrochemical cell system according to claim 3, wherein one of the charge modes comprises a standard charging mode wherein the one or more first switches associated with each first charging electrode are closed to provide the electrical current to each first charging electrode functioning as an anode and the one or more second switches associated with each fuel electrode are closed to provide the electrical current to each fuel electrode functioning as a cathode.

5. The electrochemical cell system according to claim 4, further comprising a charging mode for supplementing convective flow within one or more of the electrochemical cells wherein one or more switches associated with each second charging electrode are continuously or intermittently closed to provide the electrical current to each second charging electrode functioning as an anode and the one or more switches associated with each fuel electrode are closed to provide the electrical current to each fuel electrode functioning as a cathode.

6. The electrochemical cell system of claim 5, wherein the charging mode for supplementing convective flow further comprises the one or more switches associated with each first charging electrode being continuously or intermittently closed to provide the electrical current to each first charging electrode.

7. The electrochemical cell system according to claim 1, wherein the controller is further configured to: (c) in a discharge mode, connect a fuel electrode to a load such that the fuel electrode functions as an anode and the oxidant electrode functions as a cathode, such that oxidized fuel flows from the fuel electrode to the load and the oxidant reduction electrode reduces any received oxidizer.

8. The electrochemical cell system according to claim 1, wherein one of the charge modes comprises a mode for supplementing convective flow within one or more of the electrochemical cells, wherein one or more switches associated with each second charging electrode are continuously or intermittently closed to provide the electrical current to each second charging electrode functioning as an anode and the one or more switches associated with each fuel electrode are closed to provide the electrical current to each fuel electrode functioning as a cathode.

9. The electrochemical cell system according to claim 1, wherein one of the charge modes comprises a parallel charging mode wherein:
the first switch associated with each first charging electrode in the cell system is closed to provide the electrical current to each first charging electrode functioning as an anode,
the second switch associated with each fuel electrode is closed to provide the electrical current to each fuel electrode functioning as a cathode,
the third switch associated with the third charging electrode is closed to provide the electrical current to the third charging electrode functioning as an anode, and
a fourth switch associated with each second charging electrode is closed to provide the electrical current to each second charging electrode functioning as an anode.

10. The electrochemical cell system according to claim 1, wherein one of the charge modes comprises a mixed mode wherein the first switch associated with each first charging electrode in the cell system is closed to provide the electrical current to each first charging electrode functioning as an anode, and one of the second switches associated with one of the fuel electrodes is closed to provide the electrical current to the one fuel electrode functioning as a cathode while another second switch associated with the other fuel electrode is open.

11. The electrochemical cell system of claim 1, wherein the fuel electrode comprises a series of permeable electrode bodies arranged in spaced apart relation.

12. The electrochemical cell system of claim 1, wherein each charging electrode is selected from the group consisting of (a) the oxidant electrode and (b) a third electrode spaced from the fuel electrode and the oxidant electrode.

13. The electrochemical cell system according to claim 1, wherein said controller is configured to vary the number of charging electrodes to which the electrical current is applied while performing a recharging operation.

14. The electrochemical cell system according to claim 1, wherein the controller is configured to select between charge modes based on at least one input parameter.

15. The electrochemical cell system according to claim 14, wherein the controller is operatively connected to a sensor that senses a condition of the electrochemical cell and wherein the input parameter is the condition sensed by the sensor.

16. The electrochemical cell system according to claim 14, wherein the input parameter comprises input via a user input.

17. The electrochemical cell system according to claim 14, wherein the input parameter comprises a limit parameter and wherein the controller is further configured to compare a cell property to the limit parameter.

18. The electrochemical cell system according to claim 17, wherein the cell property comprises a voltage, a cumulative charge capacity, an impedance between electrodes, a slope of electrode voltages, a current, a resistance to a sensing electrode, or a shorting event.

19. The electrochemical cell system according to claim 1, wherein the controller comprises a charge/discharge controller.

20. The electrochemical cell system according to claim 1, further comprising a fourth charging electrode, said controller being configured to apply an electrical current to the fourth charging electrode for functioning as an anode during discharge.

21. A method of charging an electrochemical cell system, wherein the electrochemical cell system comprises:
a plurality of electrochemical cells, wherein each electrochemical cell comprises:
a set of electrodes comprising:
a fuel electrode;
an oxidant electrode spaced apart from the fuel electrode;
a first charging electrode positioned between the oxidant electrode and the fuel electrode;
a second charging electrode positioned on the side of the oxidant electrode opposite the side facing the fuel electrode;
a third charging electrode positioned between the fuel electrodes of separate electrochemical cells;
the plurality of electrochemical cells being arranged such that the fuel electrode of the set of electrodes in each electrochemical cell is positioned closest to the third charging electrode in the electrochemical cell system;
an ionically conductive medium common to the plurality of electrochemical cells and contacting the set of electrodes of each electrochemical cell; and
a controller coupled to the plurality of electrodes for controlling discharge and charge operations of the cells, said controller being configured to select between a number of different charging modes, wherein one or more of the first charging electrode and the second charging electrode is electrically connected through a switch, one or more fuel electrode is electrically connected through a switch and a third charging electrode is continuously or intermittently electrically connected through a switch;
the method comprising:
i. using the controller for charging the electrochemical cell system by:
(a) in a first charge mode, applying an electrical current between at least one charging electrode and a fuel electrode with the charging electrode(s) functioning as an anode and the fuel electrode functioning as a cathode, such that reducible metal fuel ions in the ionically conductive medium are reduced and electrodeposited as metal fuel in oxidizable form on the fuel electrode;
(b) in a second charge mode, applying an electrical current between at least one charging electrode and a fuel electrode by closing one or more switches associated with each first charging electrode and closing one or more second switches associated with each fuel electrode as well as selectively applying the electrical current to a different number of charging electrodes including the third charging electrode by continuously or intermittently closing a third switch associated with the third electrode to provide electrical current thereto so as to increase uniformity of the metal fuel being electrodeposited on the fuel electrode by affecting the rate and density of the growth of the electrodeposited metal fuel on the fuel electrode,
and
ii. disconnecting the electrical current to discontinue the charging.

22. The method according to claim 21, wherein the first charge mode is a standard charging mode and said charging comprises applying the electrical current to each first charging electrode such that each first charging electrode functions as the anode and the fuel electrode functions as the cathode.

23. The method according to claim 22, further comprising a charging mode for supplementing convective flow with one or more of the electrochemical cells wherein said charging comprises applying the electrical current to each second charging electrode such that each second charging electrode functions as the anode and the fuel electrode functions as the cathode.

24. The method according to claim 21, wherein the second charge mode comprises applying the electrical current to each first charging electrode and applying the electrical current such that each charging electrode having electrical current functions as the anode and the fuel electrode functions as the cathode.

25. The method according to claim 21, wherein the first charge mode is a charging mode for supplementing convective flow within one or more of the electrochemical cells and said charging comprises applying the electrical current to each second charging electrode such that each second charging electrode functions as the anode and the fuel electrode functions as the cathode.

26. The method according to claim 21, wherein the first charge mode is a parallel charging mode and said charging comprises applying the electrical current simultaneously to each first, second, and third charging electrode such that each first, second, and third charging electrode function as the anode and the fuel electrode functions as the cathode.

27. The method according to claim 21, the first charge mode is a mixed mode and said charging comprises applying the electrical current to each first charging electrode functioning as an anode, and wherein one fuel electrode functions as the cathode.

28. The method according to claim 21, further comprising switching a plurality of switches operatively coupled between the controller and the electrodes to charge the electrochemical cell based on the selected charging mode.

29. The method according to claim 21, wherein the fuel electrode comprises a series of permeable electrode bodies arranged in spaced apart relation.

30. The method according to claim 21, wherein each charging electrode is selected from the group consisting of (a) the oxidant electrode, (b) a third electrode spaced from the fuel electrode and the oxidant electrode, and (c) a portion of the fuel electrode.

31. The method according to claim 21, further comprising receiving at least one input parameter at the controller, wherein the controller is configured to select between charge modes based on at least one input parameter.

32. The method according to claim 31, further comprising sensing a condition of the electrochemical cell by a sensor coupled to the controller and wherein the input parameter is input by the sensor.

33. The method according to claim 31, wherein the input parameter is input via a user input.

34. The method according to claim 31, further comprising comparing a cell property to the input parameter, wherein the input parameter comprises a limit parameter.

35. The method according to claim 34, wherein the cell property comprises a voltage, a cumulative charge capacity, an impedance between electrodes, a slope of electrode voltages, a current, a resistance to a sensing electrode, or a shorting event.

36. The method according to claim 21, wherein the controller comprises a charge/discharge controller.

* * * * *